United States Patent [19]

Cech et al.

[11] 4,024,068

[45] May 17, 1977

[54] PROCESS FOR SEPARATING CERAMICS OF URANIUM AND PLUTONIUM FROM ZIRCONIUM BY HYDRIDING AND MIXTURES THEREOF

[75] Inventors: Bohuslav Cech; Evzen Kaderabek; Tomas Hanslik, all of Prague, Czechoslovakia

[73] Assignee: Ceskoslovenska akademie ved, Prague, Czechoslovakia

[22] Filed: Mar. 24, 1975

[21] Appl. No.: 561,191

[30] Foreign Application Priority Data

Mar. 24, 1974  Czechoslovakia ............... 2134/74

[52] U.S. Cl. ................ 252/301.1 R; 423/3; 423/4; 264/.5
[51] Int. Cl.² .............. C01G 43/00; C01G 56/00
[58] Field of Search .......... 252/301.1 R; 423/3, 423/4, 645; 264/.5

[56] References Cited

UNITED STATES PATENTS

| | | | |
|---|---|---|---|
| 2,827,405 | 3/1958 | Evans et al. | 423/4 X |
| 3,343,924 | 9/1967 | Anastasia et al. | 423/4 |
| 3,644,104 | 2/1972 | Manevy et al. | 252/301.1 R X |
| 3,659,107 | 4/1972 | Selle et al. | 252/301.1 R X |
| 3,715,204 | 2/1973 | De Grazio et al. | 252/301.1 R X |
| 3,720,752 | 3/1973 | Van Houten | 252/301.1 R X |
| 3,776,508 | 12/1973 | Katz | 252/301.1 R X |

*Primary Examiner*—Edward A. Miller
*Attorney, Agent, or Firm*—Burgess Ryan and Wayne

[57] ABSTRACT

A process is provided involving the use of hydrogen for the separation of uranium and plutonium and mixtures thereof, from composite substances and assemblies or mixtures containing metallic and ceramic components where the metallic component is zirconium or a zirconium alloy and the ceramic component contains uranium and/or plutonium.

4 Claims, No Drawings

PROCESS FOR SEPARATING CERAMICS OF URANIUM AND PLUTONIUM FROM ZIRCONIUM BY HYDRIDING AND MIXTURES THEREOF

STATEMENT OF THE INVENTION

The present invention relates to a method for separating uranium and plutonium and compositions containing these elements from composites and assemblies, or mixtures thereof with metallic and ceramic components. More particularly, the invention relates to a method of processing spent fuel elements from nuclear reactors and compositions or mixtures containing these elements.

BACKGROUND OF THE INVENTION

As is generally known, the spent fuel elements of nuclear reactors and compositions or mixtures thereof contain residual fissionable components that may be further utilized as a nuclear fuel. Besides these fissionable components, there are also present fuel elements and mixtures thereof, which contain construction metallic components having a low coefficient of absorption for thermal neutrons. Such construction metallic components are zirconium alloys containing tin, niobium, titanium, and other elements. The fissionable components are, in general, hard compounds of uranium and plutonium produced by ceramic methods. The fuel component is usually enclosed in thin-wall tubes made of zirconium alloys forming elements that are connected into or associated with larger assemblies enclosed in a casette tube. In addition, the assemblies contain fastening construction parts from non-fissionable metals and alloys. The single parts of the fuel assembly, when removed from the reactor, are deformed and are highly radioactive.

When nuclear fuels are reprocessed, difficulties arise during separation of the fissionable and non-fissionable components required for biological protection. The difficulty in separating fissionable and non-fissionable elements is enhanced by the different mechanical and chemical properties of these components. Uranium and plutonium compounds are extremely hard and brittle; zirconium alloys, on the other hand, are firm and tough. Many methods for improving the separation of these components have been proposed involving the use of mechanical, thermal and mechanical and chemical procedures. For example, G. Manile and G. Matchret disclosed such a procedure in U.S. Pat. No. 3,664,104, wherein the spent elements are cut into short fragments which are then mechanically processed in a ball mill. In this process, ceramic particles of the fissionable components are broken, then mechanically separated and thereafter are chemically treated. A disadvantage accompanying this method is the difficulty in cutting the metal-ceramic composite. Further, the steps in this breakdown into separate elements are lengthy and because of the need to exercise extreme precautions in the protection against nuclear radiation, this procedure is very complicated and expensive. In addition, the deformed assemblies, especially when they are very large, are difficult to handle.

Another method for the reprocessing of fuel elements in stainless steel cladding is described by R. E. Strong in British Specification No. 1,274,357/1972/which consists in melting off the metallic component of the element by means of induction heating. Chemical and electrochemical methods of cladding separation are disclosed by P. Ballot in French Pat. No. 2,081,176/1971.

The disadvantage associated with the induction heating method is the fact that this procedure is not technically and economically suitable for the separation of zirconium cladding from the ceramic component. In addition, the high melting temperature and the extremely high chemical reactivity of zirconium towards oxygen, carbon, and nitrogen leading to the simultaneous formation of high-melting compounds make the separation of both components virtually impossible. Further, heating the nuclear components to high temperatures increases the danger of contamination by volatile components.

For this reason, it seemed reasonable and advantageous to find a method for the separation of uranium, plutonium, and their compounds that would not have the drawbacks of the known methods.

SUMMARY OF THE INVENTION

This objective is achieved in the present invention by utilizing hydrogen in the separation of uranium, plutonium, and their compounds from composite substances and assemblies or mixtures comprising metallic and ceramic components where zirconium or zirconium alloys are the metallic components, and uranium and/or plutonium compounds represent the ceramic component.

DETAILED DESCRIPTION OF THE INVENTION

The present invention is based on a working procedure in which the original system is reacted with hydrogen and the formed hydrides are separated from the mixture physically and/or chemically. In a typical practice of this invention, the system to be treated with hydrogen, under pressure and at an elevated temperature. The pressure can be varied in the range from about 20 to 50 atmospheres while the working atmosphere may be varied and suitably, be from about 200° to 700° C, and suitably in the range from about 250° to 460° C.

The invention is based on the fact that fuel elements and assemblies or mixtures containing non-fissionable construction parts of zirconium, niobium, titanium, and their alloys may be separated, before processing, by being preheated in a hydrogen atmosphere, at an elevated pressure. Under these suitable conditions, the aforesaid components are rapidly converted to hydrides of high-melting metals that are brittle and easily separable. The cladding and construction parts of the fuel elements are then disintegrated either by virtue of their weight or mechanically. Very little energy is required. Steel parts that do not react with hydrogen to form hydrides may be also separated in this manner. When the parts from the high-melting metals are disintegrated, the ceramic fuel is liberated.

The invention is also based on the fact that the aforesaid hydrides may be separated from uranium and plutonium compounds mechanically due to the differences in the masses of these components. Conventional methods can be used for this separation such as sedimentation, elutriation, centrifugation, and the like. The mixture of these components is sieved and milled for this purpose. The separation in a liquid medium is most suitable because it prevents the formation of radioactive aerosols.

The hydrogenation of the non-fissionable components of the fuel elements and assemblies or mixtures considerably facilitates and simplifies the separation of high-melting alloys from nuclear fuels. The present procedure enables continuous and automatic processing of spent fuel elements. The separation of the metallic and ceramic components is accomplished in closed columns so that the possibility of the contamination of the environment is substantially eliminated.

As the procedure does not contemplate the use of a temperature in excess of about 700° C. The risk of radioactive contamination is minimized and substantially eliminated. The procedure carried out according to this invention provides a highly sufficient mechanical separation in which the losses in valuable raw materials are relatively low. The whole procedure and the final state of the separation of both main components of the fuel elements may be easily checked by conventional means, such as, measuring the radioactivity of these components.

The following examples of a practical utilization of the invention elucidate the basis of the solution without limiting, in any way, the scope of the invention.

EXAMPLE 1

A heterogeneous assembly of ceramic pellets of cylindrical shape having a diameter of approximately 8 mm and a height of 5 - 10 mm composed mainly of $UO_2$ and enclosed in a zirconium alloy tube with a 1% by weight of niobium and a wall thickness of approximately 1 mm is placed in a heated autoclave. After filling the autoclave with electrolytical hydrogen, the hydrogen pressure is elevated to 30 at., and the pressure vessel is closed. The autoclave is heated at its simultaneous rotation up to a temperature of 450° – 500° C. Before this temperature is reached, hydrogen pressure in the autoclave decreases as a result of the rapid exothermic reaction of hydrogen with the zirconium alloy. Under these conditions, the duration of the reaction does not exceed 5 minutes. The vessel is then cooled, washed at standard pressure with nitrogen and the contents of the vessel are placed in a separation column where both components — uranium oxide on one side and zirconium and niobium hydrides on the other side, are mechanically separated.

EXAMPLE 2

A fuel element for reprocessing which is enclosed in a zirconium alloy tube with 2.5% by weight of niobium with a wall thickness of 2 mm is replaced after its removal from the reactor to a pressure box (autoclave) similar to that used in Example 1. Hydrogenation follows at a constant hydrogen pressure of approximately 20 at.; the temperature of the autoclave rises spontaneously to 550° C. As soon as the temperature begins to rise, the heating is switched off and the autoclave is cooled. After cooling, the content of the autoclave is mechanically crushed, the non-breakable steel parts are separated on a coarse meshed sieve, and the part under the sieve falls into a low-melting Wood's metal alloy. The crushed hydrides remain on the surface of the sieve from which they are then removed.

EXAMPLE 3

A mixture of disassembled fuel elements together with the steel components is hydrogenated in a heated pressure vessel at a pressure in the range from 5 to 10 at. and a temperature in the range from 500° to 550° C. After cooling the autoclave, the mixture is transferred to a ball mill and the necessary amount of steel grinding balls with a diameter of 20 - 25 mm. are added. The grinding balls and all present steel parts remain on the sieve. When the size of the present steel admixtures is small, i.e., when they are present in the form of chips, the time of milling is prolonged and a sieve with a smaller mesh size is used. The part below the sieve is reacted for 2 hours at 60° – 100° C. with 8M nitric acid; after dissolving uranium and plutonium compounds, the remaining solid fraction of zirconium compounds is separated by means of filtration.

EXAMPLE 4

An assembly of fuel elements enclosed in a cassette made from an alloy of zirconium, titanium, and niobium is placed in the autoclave and blanketed thoroughly with hydrogen. The autoclave is attached to a hydrogen reservoir with a pressure of 1 at. and heated to 600° C. When this temperature is reached, exothermic hydrogenation takes place with the zirconium parts of the assembly and of the casette. The temperature in the autoclave rises up to 700° C. The reaction mixture is then cooled in a hydrogen medium under normal pressure.

What is claimed is:

1. A method of separation of a ceramic component which is a compound of uranium, plutonium or uranium and plutonium from a metallic component is zirconium or an alloy consisting essentially of zirconium and containing minor amounts of tin, iron, chromium, or niobium or combinations thereof comprising the steps of contacting composites, assemblies or mixtures containing said components with hydrogen at a temperature of from about 200° C to 700° C at about 1–100 atmospheric pressure to form brittle zirconium hydride and separating said zirconium hydride from the chemically unchanged ceramic component.

2. A method according to claim 1, wherein the ceramic component is a uranium or a plutonium compound.

3. A method according to claim 1, wherein the hydrogen pressure ranges from about 20 to 50 at.

4. A method according to claim 1, wherein the temperature is in the range of about 250° to 460° C.

* * * * *